McClintock Young, Jr.
Self Raker.
No. 3,979. Reissued May 17, 1870.
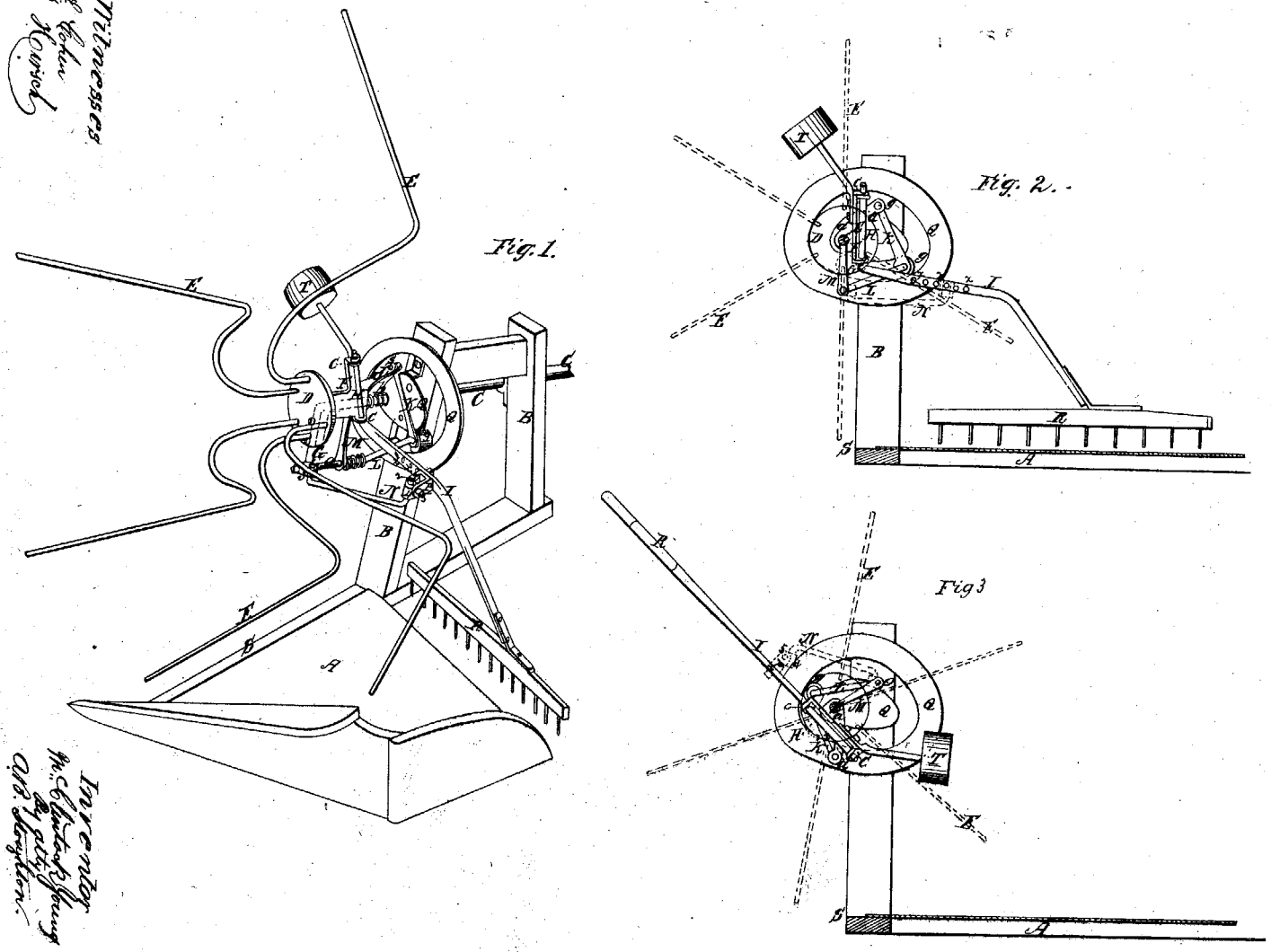
Witnesses
E. Cohen
J. Hirsch
Inventor
McClintock Young
By att'y
A.B. Stoughton
N. PETERS, PHOTO-LITHOGRAPHER, WASHINGTON, D. C.

UNITED STATES PATENT OFFICE.

CYRUS H. McCORMICK AND LEANDER J. McCORMICK, OF CHICAGO, ILLINOIS, ASSIGNEES OF McCLINTOCK YOUNG, JR.

IMPROVEMENT IN COMBINED RAKES AND REELS FOR HARVESTERS.

Specification forming part of Letters Patent No. 30,103, dated September 18, 1860; reissue No. 3,979, dated May 17, 1870.

*To all whom it may concern:*

Be it known that McCLINTOCK YOUNG, Jr., of the city and county of Frederick, in the State of Maryland, invented certain new and useful Improvements in a Combined Rake and Reel for Harvesting-Machines, of which the following is a full, clear, and exact description, reference being had to the accompanying drawings, which make part of this specification, and in which—

Figure 1 represents, in perspective, a rear view, as seen from the divider side, of so much of a harvester embracing the said improvements as is necessary to illustrate the invention herein claimed; Fig. 2, a vertical section through the same between the rake-pivot and the reel-hub; Fig. 3, a similar view with the rake in a different position.

The invention herein claimed relates to that class of harvesters in which a combined reel and rake are supported on one side only of the platform of a harvesting-machine, while their arms revolve over said platform.

The object of the first part of the invention is to reel the grain into the cutters and lay it, when cut, properly upon the platform; and this is accomplished by mounting the reel on a shaft supported at the gearing side of the machine only, and inclined upward from the gearing toward the grain side of the machine at an acute angle to the horizon. The object of the next part of the invention is to combine with the reel a rake, which revolves around the reel-shaft, and also turns on an axis both eccentric and transverse thereto, when sweeping the cut grain from the platform, in order to discharge it at the side of the machine.

The invention herein claimed constitutes an improvement on the machines for which two several Letters Patent of the United States have been granted to the said McCLINTOCK YOUNG, Jr., respectively dated September 21, 1858, and June 28, 1859.

In the accompanying drawings, a platform, A, is shown as connected in the usual manner with a finger-beam, S, upon which is mounted a support, B, for the inclined reel-shaft C. This shaft, it will be observed, is arranged slightly in advance of the front edge of the platform, and inclines upward from the stubble toward the grain side of the platform at an acute angle thereto—say about fifteen degrees. A head or boss, D, on the inner end of this shaft has secured to it a series of reel-arms, E. These arms, it will be observed, diverge from the shaft C at an angle corresponding with its inclination to the platform, so that they sweep over the platform parallel with the platform. In the drawings five reel-arms are shown mounted in the boss D, so as to leave the two arms between which the rake works at a distance apart greater than that between the other arms, by which means the standing grain is acted upon by the arms at shorter intervals than usual, while, at the same time, room is left between the two arms farthest apart for the proper working of the rake, which also acts as a reel-arm during a portion of its circuit, and this compensates for the interval left for it between the arms.

The construction of the reel in the manner above described causes the reel-arms, as they rotate, to descend into the standing grain in advance of the cutters to press the cut grain back upon the platform, and also, in some degree, to draw the grain toward the discharge end of the platform, and thus aid the rake in discharging the gavel.

A rake supporter or plate, F, is mounted loosely on the reel-shaft C, which shaft passes through bearings in lugs *a* on the supporter, the supporter being prevented from moving endwise by a spring, *b*, which presses it against an arm, G, on the shaft. The shank or pivot H of the rake-arm I passes through the lugs *c* of the plate F, and turns freely therein. An arm, *d*, projecting from the plate F is pivoted at its outer end to a link, K, to the outer end of which is also attached the crank-arm L, which carries the roller *g*. The straight portion (or rock-shaft O) of the arm L is parallel with the reel-shaft C, and turns in bearings in the arm G and pillar M. A brace-rod or pitman, N, is hung at one end to a turning box or collar, 3, on the rock-shaft O, while its other end is connected to a similar turning box or collar, 4, pivoted in a bracket, P, on the rake-arm I. This bracket P is connected to the rake-handle I by a screw passing through any one of a series of holes, *x*, in the arm I; and, as these holes are at different distances from the pivot H of the rake, the range of motion of the rake in sweeping over the platform may be varied by setting the collar 4 into one or the other of these holes. As this brace-rod or pitman N is the medium through which the rake is impelled, a swiveling or compound movement is demanded for it, and such movement is provided for by means of the turning boxes or swiveling joints above described.

The rotation of the reel-shaft C carries the rock-shaft O around with it, and causes the guide-roller *g* on the crank-arm L of the rock-shaft O to traverse the cam Q. The shape of this cam is best seen in Figs. 2 and 3, and it will be observed that it is eccentric to the reel-shaft C, and of an elliptical shape.

By the mode of construction above described the roller *g* acts through the link K on the crank-arm *d* of the plate F, and causes the latter not only to rotate with the reel-shaft, but to have a variable motion relative thereto. The relation of these parts is such that as the rake moves forward to enter the standing grain, it will perform the function of a reel-arm, or move in a path nearly coincident with that of the reel-arms; but as the shape of the cam causes it to move somewhat faster than the reel rotates, it enters the grain closely behind one of the reel-arms; but in sweeping over the platform it moves more slowly than the reel-arms, thus avoiding the scattering of the grain when raking off. The rake enters the standing grain, and presses it back upon the platform. When the rake has passed a short distance back of the front edge of the platform its pivot H is vertical, and the guide-roller *g* is passing through the lower part of the cam Q, as shown in dotted lines at 6 in Fig. 2, which part is of the form of the arc of a circle of which the pivot 8 of the arm *d* forms the center. The rotation of the plate F consequently ceases for a moment, and the rake therefore ceases to revolve with the reel; but as the shaft C rotates continuously, the crank-arm G and connecting-rod N cause the rake-arm to turn on its shank or pivot H, and the rake is thus turned so as to sweep horizontally over the platform to discharge the gavel. The rake is thus brought into the position shown in Figs. 1 and 2. The peculiar shape of the camway now causes the roller *g* to approach the shaft C more rapidly than the rake rotates, and thus, through the link K and arm *d*, to turn the rake on the shaft C more rapidly than that shaft rotates. This movement causes the pitman N to draw the rake inward within the circle of the reel-ribs as it rises and moves forward to re-enter the standing grain, making it reassume its radial position to act as a reel-arm again. (See Fig. 3.) The accelerated velocity thus given to the rake compensates for the time lost in raking off and enables it to complete its revolution in the same time as the reel, although moving with varying speed during different parts of its circuit.

As the rake descends into the standing grain, the camway causes the roller *g* to approach close to the shaft C of the rake, and the rake and reel move at a rate of speed nearly uniform, the rake-pivot H being now in front of the shaft C, and the rake extending farther into the standing grain than the reel-gatherers, as shown in Fig. 3.

The operation above described is repeated at every revolution of the reel.

A counterpoise, T, attached to the plate F, opposite the pivot H, serves to equalize the movements of the rake in rising and descending, preventing jerks and jars, to which it would otherwise be subject.

What is claimed herein as the invention of the said McCLINTOCK YOUNG, Jr., is—

1. The reel having ribs or gatherers supported at one end only, and diverging longitudinally from a central hub mounted on an inclined shaft, substantially as and for the purpose hereinbefore set forth.

2. The arrangement, substantially as hereinbefore set forth, relatively to the finger-beam and platform, of the reel-shaft mounted upon and inclined at an angle to the finger-beam, and having ribs or gatherers diverging longitudinally from the shaft.

3. The combination of the reel having longitudinally-diverging gatherers, supported at one end only, and revolving on an inclined axis, with the rake revolving around said reel-shaft, and oscillating on an axis both eccentric and inclined transversely to the reel-shaft, these parts operating in combination, substantially as hereinbefore set forth.

4. The combination of the revolving shaft carrying diverging reel-gatherers, supported at one end only, the fixed double-walled cam, and the rake revolving around said shaft, and oscillating on an axis both eccentric and transverse to said shaft, substantially as hereinbefore set forth.

5. The combination of a reel, a rake turning on the same shaft as the reel, but in a path varying therefrom, and a counterpoise to equalize the movements of the rake, substantially as described.

McCLINTOCK YOUNG, Jr.
C. H. McCORMICK.
L. J. McCORMICK.

Witnesses as to signatures of CYRUS H. McCORMICK and McCLINTOCK YOUNG, Jr.:
JAMES W. ADAMS,
R. H. McCORMICK.

Witnesses as to signature of LEANDER J. McCORMICK:
C. A. SPRING, Jr.,
W. R. SELLECK.